Patented June 12, 1951

2,556,300

UNITED STATES PATENT OFFICE 2,556,300

INSECTICIDAL COMPOSITION

Jere C. Showalter, Goose Creek, Tex., assignor to Standard Oil Development Company, a corporation of Delaware No Drawing. Application October 22, 1945, Serial No. 623,849

5 Claims. (Cl. 167—30)

The present invention is directed to a composition suitable for use in combating insects. The composition may be applied to plants or animals without harm thereto while it is destructive toward insects with which it comes in contact.

The composition of the present invention has the character of adhering strongly to the surface to which it is applied and resisting weathering so that it retains its effectiveness over long intervals of time. The composition of the present invention is particularly suitable for application to surfaces of plants and animals, subject to insect infestation, which are exposed to wind and rain.

The composition of the present invention may be described generally as an oil-in-water type emulsion wherein the continuous phase is water and the discontinuous phase comprises in admixture an insect destroying agent, a volatile aromatic hydrocarbon, a non-volatile white petroleum oil and an emulsifying agent.

The insect destroying agent is a halogenated hydrocarbon which may be described as having the composition

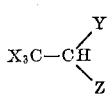

wherein X represents a member of the halogen group and Y and Z each represents a radical selected from the group consisting of mono-valent aliphatic, araliphatic and aromatic radicals of the benzene series. The best known representative of the active ingredient in the composition of the present invention is dichloro diphenyl trichloroethane (commonly referred to as DDT) and this material as well as other members of the group useful for destroying insects, are described in detail in Muller, U. S. Patent 2,329,074, September 7, 1943, reissued December 4, 1945, as Reissue 22,700, which was reissued September 30, 1947, as Reissue 22,922.

The non-volatile white oils employed in the composition of the present invention are those derived from petroleum and free or substantially free from aromatic constituents. These white oils are well known commercially. It may be stated that any white oil which will pass the United States Pharmacopeia Test may be employed in the composition of the present invention.

The volatile aromatic material in the composition may be any of the well-known aromatic solvents. Examples of such well-known aromatic solvents are xylol, toluene, benzene and substituted aromatic materials, such as the alkylated benzenes.

A number of emulsifying agents are well-known to the art which may be employed for producing a stable emulsion involving the active halogenated hydrocarbons, the volatile aromatic hydrocarbons and the non-volatile white petroleum oil employed in the composition of the present case. As an example of a class of suitable emulsifying agents may be mentioned salts of sulfonates derived from petroleum. These sulfonates may be ammonium sulfonates or other alkaline derivatives, such as sodium or potassium salts of sulfonates. These sulfonates employed may be separated from petroleum mahogany acids or may be prepared from pure hydrocarbons.

The composition which serves as the discontinuous phase of the emulsion should include not over 50% by weight of the volatile aromatic solvent, not over 5% by weight of the non-volatile white petroleum oil and not over 5% by weight of the emulsifying agent. The amount of the active halogenated agent and volatile aromatic solvent may be varied over a substantial range; it is usually desirable for the ratio of active halogenated agent to volatile aromatic solvent to remain at approximately .80 although the ratio may be varied from 0.6 to 1.0 and satisfactory results obtained.

In commercial operations employing the present invention, it will be desirable to prepare a mixture which serves as the discontinuous phase of the emulsion at some central point and to admix this composition with the water necessary to make the emulsion at the place the emulsion is to be applied in order to eliminate the expense of transporting large amounts of water. The composition obtained by admixing the insect destroying agent, the volatile aromatic hydrocarbon, the white oil and emulsifying agent may be admixed with a relatively large amount of water to form the completed insecticidal composition. It will usually be desirable to admix 1 volume of the material which serves as the discontinuous phase with from 5 to 10 volumes of water in order to form the finished insecticidal composition of the present invention.

The following is given as a specific example illustrating the present invention.

EXAMPLE

A mixture to be used as the discontinuous phase in an emulsion was made by thoroughly admixing the following ingredients:

Table I

| | Weight per cent |
|---|---|
| Dichloro diphenyl trichloroethane | 40 |
| Xylol | 53 |
| Ammonium sulfonates | 4 |
| White oil | 3 |
| | 100 |

To this mixture was added water in an amount of 7 volumes of water for each volume of the composition to form an oil-in-water type of emulsion. This emulsion was sprayed on foliage of growing cotton and in the month following the application of the insecticide leaves were gathered from the cotton plants at random over the area sprayed and the leaves tested for dichloro diphenyl trichloroethane content. The result of the test was as follows:

Table II

| Time, Days | Total Rainfall, Inches | Grams DDT/100 Cotton Leaves | DDT Remaining, Per Cent of Original |
|---|---|---|---|
| 0 | 0 | 0.437 | 100.0 |
| 6 | 1$\frac{26}{32}$ | 0.396 | 91.0 |
| 7 | 1$\frac{13}{32}$ | 0.382 | 87.5 |
| 14 | 1$\frac{19}{32}$ | 0.324 | 74.2 |
| 17 | 1$\frac{31}{32}$ | 0.238 | 54.0 |
| 19 | 2$\frac{3}{32}$ | 0.159 | 36.5 |
| 31 | 2$\frac{4}{32}$ | 0.128 | 29.3 |

From the above example it will be seen that a substantial portion of the insect destroying agent is maintained on the foliage of the plant even after exposure to sunshine, wind and rain. It may be mentioned that the application of this spray to the cotton plants was without any noticeable detrimental effect to the vegetation.

In another test a water-in-oil emulsion of the same composition as given in the example was applied to a portion of a field of cotton and a dust mixture of talc and dichloro diphenyl trichloroethane was applied at the same time to another portion of the field. In this experiment it was found that when the content of dichloro diphenyl trichloroethane which had been applied to the leaves in the form of a water-in-oil type emulsion had been reduced approximately 50%, that which had been applied to the leaves as a dust had been reduced approximately 100%. The effectiveness of the composition of the present invention in resisting the effects of weather when applied to surfaces is attributed to the white oil binding the insect destroying agent to the surface.

It is to be emphasized that my composition is concerned with a novel composition which is not injurious to surfaces to which it is applied, such as growing plants. Volatile aromatic solvents have been employed as solvents in insecticidal compositions comprising such insect destroying agents as dichloro diphenyl trichloroethane but the compositions of this character heretofore known to the art have usually been deleterious to growing plants. In contrast, the compositions of the present invention including the volatile aromatic solvent is not detrimental to the foliage of plants to which it is applied.

Having fully described the present invention, what I desire to claim is:

1. An insecticidal composition of matter consisting of no more than 5% white petroleum oil, no more than 5% salt of a petroleum alkaline sulfonate and approximately equal amounts of para dichloro diphenyl trichloroethane and of a volatile aromatic solvent.

2. An insecticidal spray oil in the form of an oil-in-water type emulsion consisting of a major portion of water as the continuous phase and a minor portion of the discontinuous phase, said discontinuous phase consisting of no more than 5% white petroleum oil, no more than 5% salt of a petroleum alkaline sulfonate and approximately equal amounts of para dichloro diphenyl trichloroethane and of a volatile aromatic solvent.

3. An insecticidal composition in accordance with claim 2 in which approximately one volume of the discontinuous phase is present in seven volumes of the continuous phase.

4. A composition in accordance with claim 2 in which approximately 1 volume of the discontinuous phase is present in each 7 volumes of the continuous phase and in which the discontinuous phase consists of 40% by weight para dichloro diphenyl trichloroethane, 53% by weight xylol, 4% by weight ammonium salt of petroleum sulfonates and 3% by weight petroleum white oil.

5. An insecticidal composition of matter consisting of 40% by weight of para dichloro diphenyl trichloroethane, 53% by weight of xylol, 4% by weight of ammonium petroleum sulfonates, and 3% by weight of petroleum white oil.

JERE C. SHOWALTER.

REFERENCES CITED

The following references are of record in the file of this patent:

UNITED STATES PATENTS

| Number | Name | Date |
|---|---|---|
| Re. 22,700 | Muller | Dec. 4, 1945 |
| 1,785,451 | Lambert | Dec. 16, 1930 |
| 1,877,851 | Grant | Sept. 20, 1932 |
| 2,134,158 | Volck | Oct. 25, 1938 |

FOREIGN PATENTS

| Number | Country | Date |
|---|---|---|
| 547,871 | Great Britain | Sept. 15, 1942 |